(12) United States Patent
Tanaka et al.

(10) Patent No.: US 6,747,882 B2
(45) Date of Patent: Jun. 8, 2004

(54) POWER CONVERSION DEVICE

(75) Inventors: Atsushi Tanaka, Kanagawa-ken (JP); Hiroshi Yoshida, Kanagawa-ken (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 10/151,169

(22) Filed: May 21, 2002

(65) Prior Publication Data

US 2002/0176267 A1 Nov. 28, 2002

(30) Foreign Application Priority Data

May 22, 2001 (JP) ........................................ 2001-151766

(51) Int. Cl.$^7$ ............................ H02M 3/24; G05B 11/32
(52) U.S. Cl. ............................ 363/78; 363/97; 318/625; 318/566
(58) Field of Search ..................... 363/78, 95, 96, 363/97, 98, 132; 318/140, 156, 745, 746, 796, 625, 566, 565

(56) References Cited

U.S. PATENT DOCUMENTS 6,384,561 B1 * 5/2002 Niizuma et al. ............ 318/625

FOREIGN PATENT DOCUMENTS

| JP | 6-296396 A | | 10/1994 |
| JP | 6-296396 | * | 10/1994 |
| JP | 7-231697 A | | 8/1995 |

* cited by examiner

*Primary Examiner*—Rajnikant B. Patel
(74) *Attorney, Agent, or Firm*—Foley & Lardner LLP

(57) ABSTRACT

A power conversion device including, a power converter controlling a motor in variable speed control, first to second control circuits outputting first to second control signals, first to second detectors detecting a state of the power converter and outputting first to second detection signals to the first to second control circuits, a switch receiving the first to second control signals and outputting one of the control signals to the power converter, and a selection circuit outputting a changeover selection signal to the switch for outputting the second control signal instead of the first control signal, when the switch has outputted the first control signal and the first control circuit fails.

12 Claims, 10 Drawing Sheets

POWER CONVERSION DEVICE

CROSS-REFERENCE TO RELATED APPLICATIONS

This application is based upon and claims the benefit of priority from Japanese Patent Application No. 2001-151766 filed on May 22, 2001, the entire contents of which are incorporated herein by reference.

BACKGROUND OF THE INVENTION

1. Field of the Invention

This invention relates to an electric power conversion device for variable-speed controlling of a motor driving a pump, for example and more specifically, to an electric power conversion device equipped with multiplex control units to enable it to continue controlling even if a control circuit breaks down in operation.

2. Description of the Related Art

For example, with respect to a power conversion device such as one used in a recirculation pump power equipment with variable frequency control in a nuclear power plant, generally only one control unit for controlling variable frequency is equipped with the power conversion device. That is, although a control device is composed as a single component, in an institution for which advanced reliability is required, such as a nuclear power plant, redundant dual components having both an operation system and a standby system as multiplex control units are adopted in consideration of safety.

Hereafter, a conventional example of the multiplex control units of the power conversion device is explained in reference to FIGS. 7 through 10. As shown in FIG. 7, a power conversion device 100 is connected between an AC power supply 1 and a motor 3 for driving a recirculation pump and is composed of a power converter 20 for variable-speed control of the motor 3.

As shown in FIG. 7, a conventional power conversion device has multiplex control units of a power converter 20, that is, it is composed of the power converter 20 as a control target, a control circuit A 121 and a control circuit B 122, which are arranged dual to control the power converter 20, a selector switch 21 for switching from one control circuit to another control circuit, and a selection circuit 22 for outputting a changeover selection signal to the selector switch 21. When the control circuit A 121 is operating, the control circuit B 122 is a standby. An input side circuit of the power converter 20 is connected to current transformers (CT) 101 and 102 for detecting circuit current, and an output side circuit of the power converter 20 is connected to power transformers 111 and 112, respectively. Detected outputs from the current transformer 101 and the power transformer 111 and detected outputs from the current transformer 102 and the power transformer 112 are inputted to the control circuit A 121 and the control circuit B 122, respectively.

As shown in FIG. 8A and FIG. 8B, in an ordinary state, the power converter 20 is controlled and driven by the control circuit A 121 as an operating unit (this is denoted as S41 in FIG. 8). When the power converter 20 works normally but the control circuit A 121 is broken for some reason (S42), the selection circuit 22 outputs a changeover selection signal to the selector switch 21, and the selector switch 21 changes a contact from the control circuit A 121 to the control circuit B 122 (S43), and the control circuit B 122, which was a standby equipment, starts to control the power converter 20 (S44), and continues the control of the power converter 20.

Moreover, as shown in FIG. 9A and FIG. 9B, in a case that the control circuit A 121 controls the power converter 20 (S51 in FIG. 9) and monitors a state of the power converter 20 by receiving detected signals of circuit and voltage from the current transformer 101 and the power transformer 111, respectively, etc., when the power converter 20 breaks down (S52), the control circuit A 121 detects an abnormal state of the power converter 20 (S53), the selector switch 21 receives a changeover selection signal outputted from the selection circuit 22 and switches a contact from the control circuit A 121 to the control circuit B 122 (S54). In this situation, if the control circuit B 122 also detects an abnormal state of the power converter 20, it judges this detection as a failure of the power converter 20 and stops operation of the power converter 20.

In the above-mentioned conventional multiplex control units of the power conversion device 2, when the control unit A 121 in an operation has broken (from S61 to S62 in FIG. 10), it is possible that the power converter 20 itself is influenced by the breakage of the control unit 121 and enters an abnormal state (S63).

In this case, while the power converter 20 has been in the abnormal state, even if the selector switch 21 changes a contact from the control circuit A 121 to the control circuit B 122 to try to continue the control of the power converter (S64), the control circuit B 122 also detects a failure of the power converter 20 (S65) since the power converter 20 is still in an abnormal state, and thus the power converter has to be stopped (S66) and here it becomes impossible to keep controlling of the power converter 20. Therefore, there is an issue concerning the reliability for a motion of the power control device 100. That is, though it may be equipped with multiplex control units, a breakdown of single a control circuit may make it impossible to continue controlling the power converter 20 and there is a possibility that the power conversion device 100 will stop operating.

SUMMARY OF THE INVENTION

In view of the foregoing, it is a main object of this invention is provide a power conversion device for addressing this issue with high reliability, equipped with multiplex control units for enabling continued operating and controlling of the power converter even if the single control unit breaks while preventing the power converter from being influenced by the breakdown.

Other and further objects of this invention will become apparent upon an understanding of the illustrative embodiments to be described herein or will be indicated in the appended claims while various advantages not referred to herein will be appeared to one skilled in the art upon employment of the invention in practice.

According to an aspect of the present invention, there is provided a power conversion device including, a power converter which controls a motor in variable speed control, a first control circuit which outputs a first control signal to control the power converter, a second control circuit which outputs a second control signal to control the power converter, a first detector which detects a state of the power converter and outputs a first detection signal to the first control circuit, a second detector which detects a state of the power converter and outputs a second detection signal to the second control circuit, a switch which receives the first control signal and the second control signal and outputs one of the first control signal and the second control signal to the power converter, a selection circuit which outputs a changeover selection signal to the switch for outputting the second control signal instead of the first control signal when the switch has outputted the first control signal and the first control circuit fails.

According to another aspect of the present invention, there is provided a power conversion device including, a power converter which controls a motor in variable speed control, a first control circuit which outputs a first control signal to control the power converter, a second control circuit which outputs a second control signal to control the power converter, a restore circuit which outputs a restoring signal to restore the power converter to return a previous state of the power converter, a first detector which detects a state of the power converter and outputs a first detection signal to the first control circuit, a second detector which detects a state of the power converter and outputs a second detection signal to the second control circuit, a switch which receives the first control signal, the second control signal and the restoring signal and outputs one of the first control signal, the second control signal and the restoring signal to the power converter, and a selection circuit which outputs a changeover selection signal to the switch, firstly for outputting the restoring signal instead of the first control signal, when the switch has outputted the first control signal and the first control circuit fails, and for outputting the second control signal instead of the restoring signal after the power converter has been returned to a previous normal state.

According to still another aspect of the present invention, there is provided a power conversion device including, a power converter which controls a motor in variable speed control, a first control circuit which outputs a first control signal to control the power converter, a second control circuit which outputs a second control signal to control the power converter, a third control circuit which outputs a third control signal to control the power converter, first, second and third detectors each of which detects a state of the power converter and outputs, respectively, first, second and third detection signals to, respectively, the first, second and third control circuits, and a majority selection circuit which receives the first, second and third control signals, determines which of these three control signals forms a majority and outputs one of such majority signals to the power converter.

According to still another aspect of the present invention, there is provided a control method of a power converter, which controls a motor in variable speed control, including, first detecting of at least one of a current and a voltage of a first circuit at a side of the power converter, second detecting of at least one of a current and a voltage of a second circuit at a side of the power converter, first generating of a first control signal to the power converter in a first controller corresponding to the first circuit, second generating of a second control signal to the power converter in a second controller corresponding to the second circuit, sending the first control signal to the power converter as a direct control signal, and after the sending of the first control signal switching the direct control signal to be sent to the power converter from the first control signal into the second control signal when failure of the first control circuit is detected.

BRIEF DESCRIPTION OF THE DRAWINGS

A preferred form of the present invention is illustrated in the accompanying drawings in which.

DETAILED DESCRIPTION OF THE INVENTION

Figure 1:
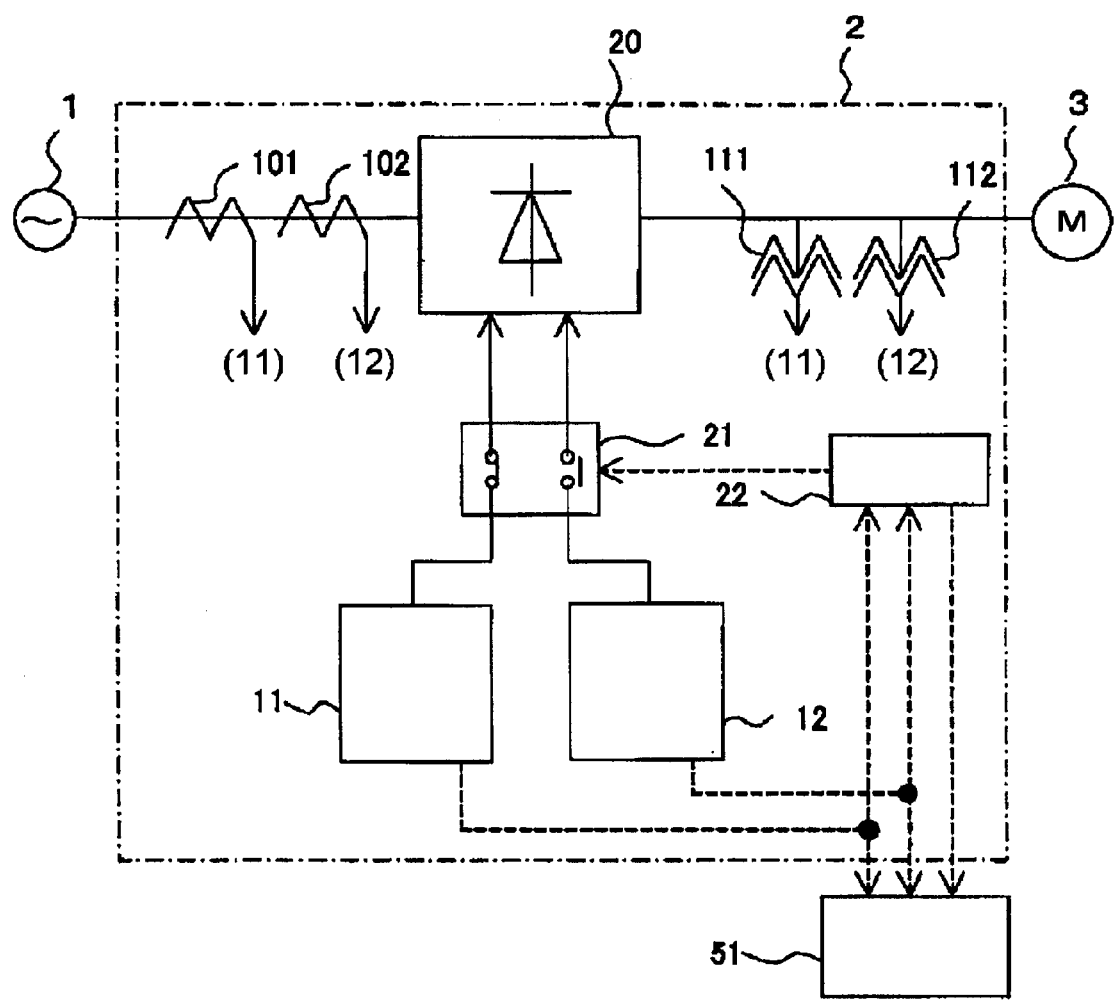
FIG. 1 is a basic block diagram showing a power conversion device of a first embodiment of this invention.

Referring now to the drawings, wherein like reference numerals designate identical or corresponding parts throughout the several views, the embodiments of this invention will be described below.

First Embodiment

Hereafter, a power conversion device of a first embodiment in this invention is explained with reference to FIG. 1 and FIG. 2. Shown in FIG. 1 is a power source 1, a motor for driving a recirculation pump (not illustrated) and a power converter 20 for controlling of the motor 3 in variable-speed control arranged between the power source 1 and the motor 3. In this embodiment, as shown in FIG. 1, multiplex control units of this power converter 20 is composed of multiplex circuits with a control circuit A 11 and a control circuit B 12, both of which control the power converter 20, and a selector switch 21 for switching from one control circuit to another control circuit, and a selection circuit 22 for outputting a changeover selection signal to the selector switch 21. When the control circuit A 11 is in operation, a control signal outputted from the control circuit A 11 is inputted to the power converter 20, and another control circuit B12 is standby.

An input side circuit of the power converter 20 is connected to current transformers (CT) 101 and 102 for detecting circuit current, and an output side circuit of the power converter 20 is connected to power transformers 111 and 112, respectively. Detected outputs from the current transformer 101 and the power transformer 111 and detected outputs from the current transformer 102 and the power transformer 112 are inputted to the control circuit A 11 and the control circuit B 12, respectively.

Figure 2:
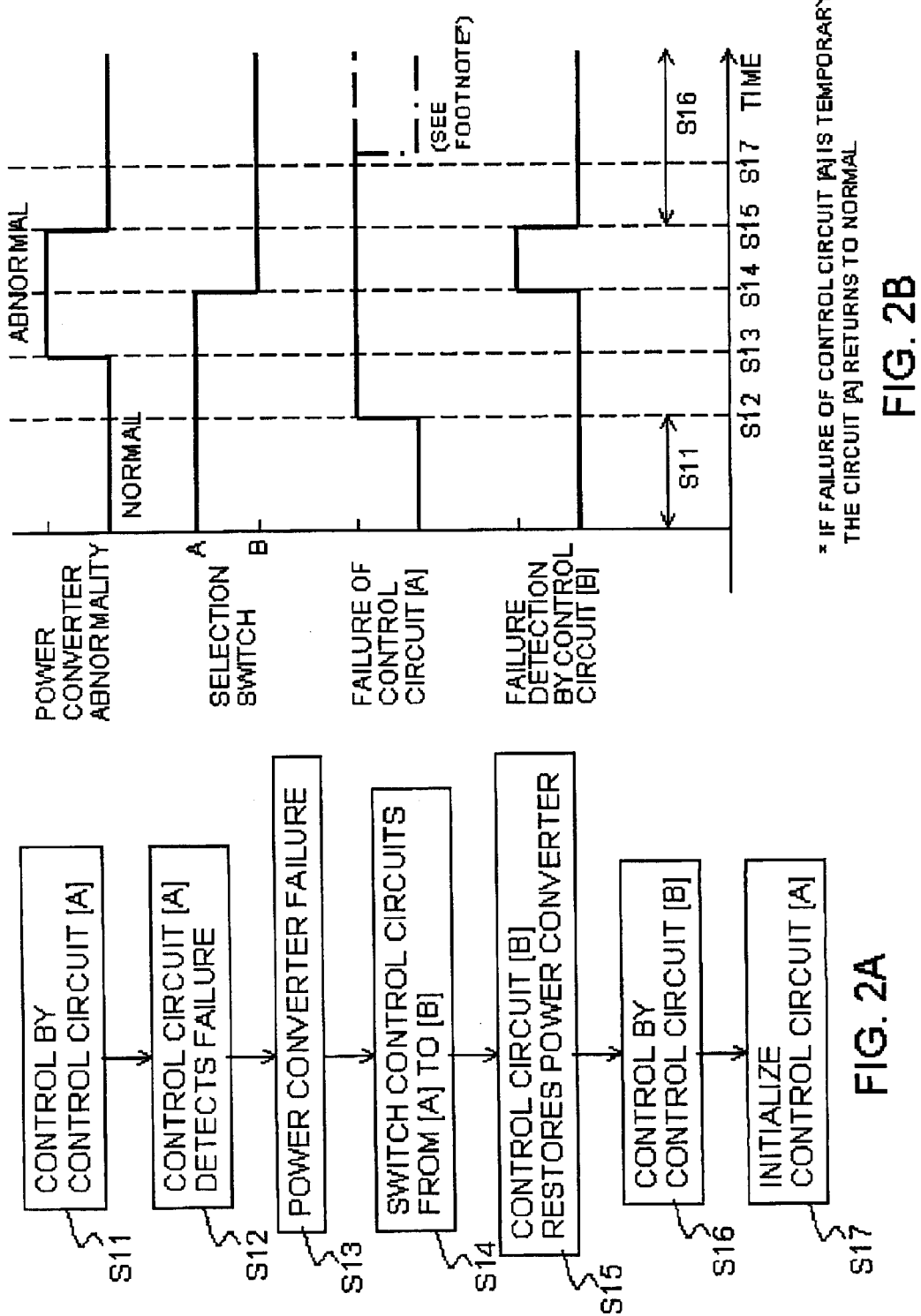
FIG. 2A is a flow chart showing a motion example of the power conversion device of the first embodiment as shown in FIG. 1.
FIG. 2B is a time chart corresponding to FIG. 2A.

As shown in FIG. 2A and FIG. 2B, in an ordinary state, the power converter 20 is controlled and driven by the control circuit A 11 as an operating unit (this step is denoted as S11 in FIG. 2). When the power converter 20 works normally but the control circuit A 11 is broken for some reason (S12), the selection circuit 22 outputs a changeover selection signal to the selector switch 21, and the selector switch 21 changes a contact from the control circuit A 12 to the control circuit B 12 (S14), and the control circuit B 12, which was a standby equipment, starts to control the power converter 20 (S116), and continues the control of the power converter 20.

Here, the failure of the control circuit A 11 is detected by one of following steps. That is, for example, when a current value or a voltage value of a circuit of the power converter 20, detected by the current transformer 101 and the power transformer 111 corresponding to the control circuit A11 exceeds a predetermined level, it judges as the failure of the control circuit A 11. While, as another example, a monitor (not illustrated) of the control circuit A 11 is arranged in the power conversion device 2, to monitor the output of the control circuit A 11, and when the monitor detects the control signal outputted from the control circuit A 11 exceeding a predetermined level, that is, an abnormal signal, the monitor detects the failure of the control circuit A 11. It is also possible to use a self-diagnostic function of the control circuit A 11 for detecting the failure.

In this embodiment of such a composition, when the control circuit A 11 in operation breaks down for some reason (S12), the selection switch 21 stops the controlling by the control unit A 11 and switches to another control circuit B 12 (S14). In this case, if a current value or a voltage value of a circuit of the power converter is abnormal detected by signals outputted from the current transformer 101, 102 and the power transformer 111, 112, it judges as a failure of the power converter 20 occurs (S13) and a control circuit B 12 outputs a restoring operation signal to the power converter 20 for restoring the power converter 20. That is, for example, when a condenser in a circuit constructing the power converter 20 stores electric charges due to the failure of the control circuit A 11, the control circuit B 12 outputs a discharge command signal to discharge the condenser of the power converter 20, and after finishing the discharge, the control circuit 12 starts to control the power converter 20.

Then, the electric power converter 20 returns to a normal state and the current value and the voltage value of a circuit is registered in normal ranges. After that, by controlling of the power converter 20 by the control circuit B 12 which had been a standby and having been changed to being in operation instead of the control circuit A 11 (S16), the operation of the power converter 20 can be continued.

On the other hand, it initializes the control circuit A 11 in which a failure was occurred (S17). Thus, if the failure of the control circuit A 11 is only temporary, the control circuit A 11 can be reset to an ordinary state. Meanwhile, if the control circuit B 12 fails and thus the control circuit failure continues, by switching the control circuits from the control circuit A 11 to the control circuit B 12 and restoring the power converter 20 by the changed control circuit A 11, following the same actions as mentioned above, it can continue normal operation and controlling of the power converter 20. Moreover, a recording unit 51 records states of the control circuits A 11 and B 12 and the selector switch 22. Thus, investigation of a factor causing an unusual state in the switching of the control circuits can be made more easily.

According to this embodiment, even if a single failure occurs in the multiplex control units, it becomes possible to continue reliable operation and controlling of the power converter 20 by changing the control circuits, thus it can obtain a power conversion device equipped with the highly-reliable multiplex control units and higher rate of operation of the system.

Second Embodiment

Next, a power conversion device of a second embodiment of this invention is explained with reference to FIG. 3 and FIG. 4. In addition, the same portion as the first embodiment shown in FIG. 1 and FIG. 2 is attached to the same element numbers as in FIG. 1 and FIG. 2, and their explanations are omitted.

Figure 3:
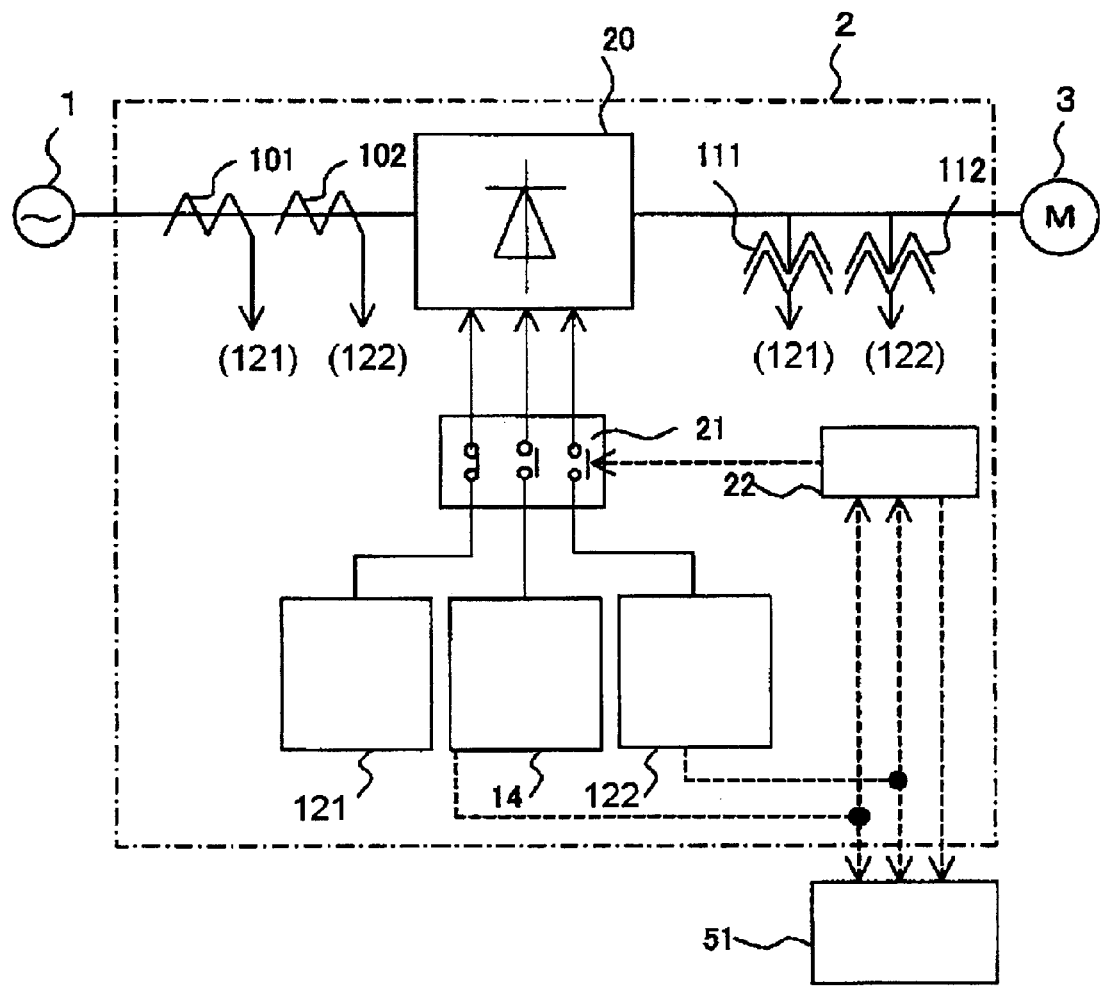
FIG. 3 is a basic block diagram showing a power conversion device of a second embodiment of this invention.
Figure 4:
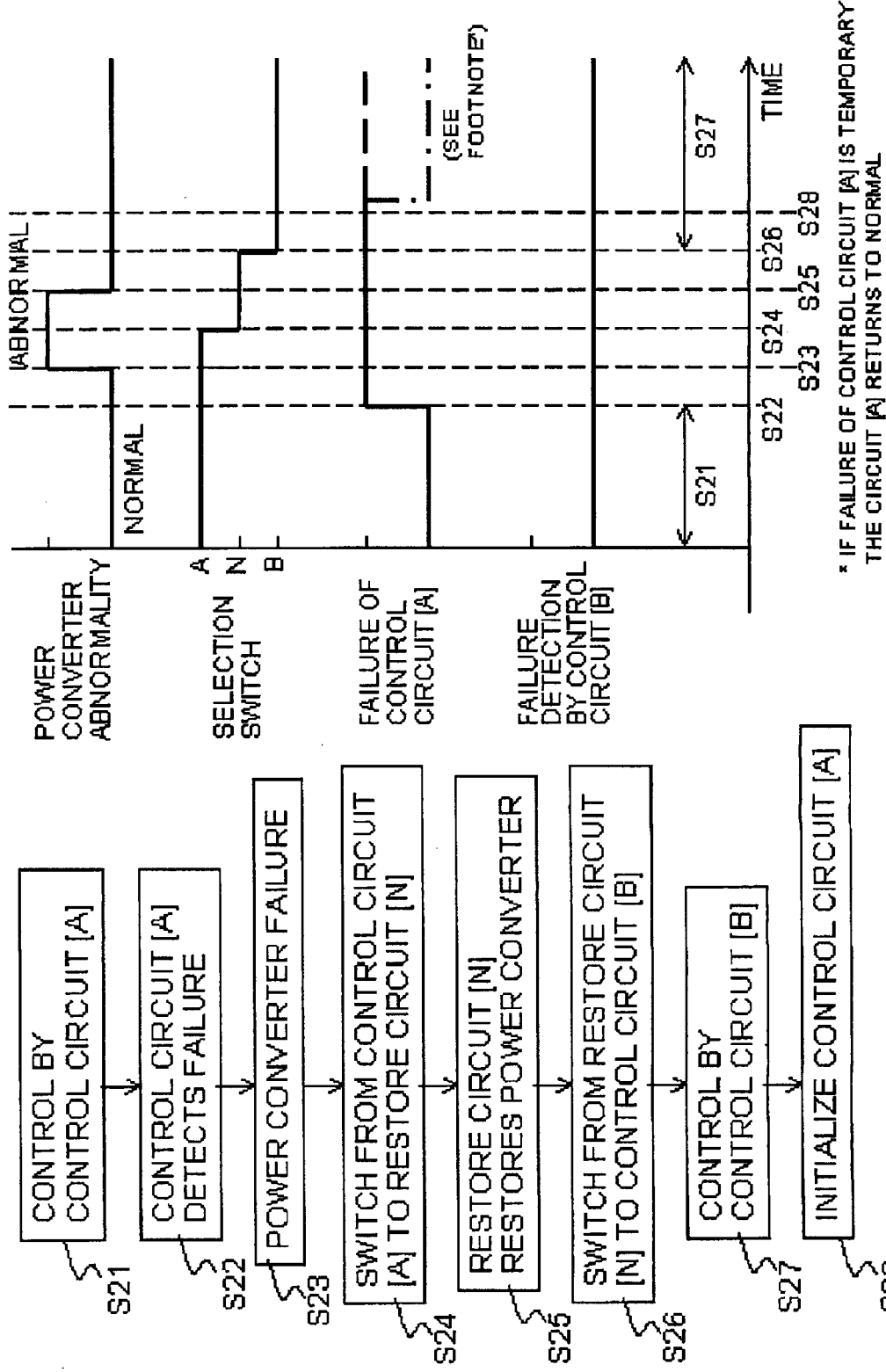
FIG. 4A is a flow chart showing a motion example of the power conversion device of the second embodiment as shown in FIG. 3.
FIG. 4B is a time chart corresponding to FIG. 4A.

In this embodiment, as shown in FIG. 3, multiplex control units of this power converter 20 for variable-speed control of the motor 3 is composed of multiplex circuits with a control circuit A 121 and a control circuit B 122, both of which control the power converter 20, a restore circuit N 14, and a selector switch 21 for switching from one of the control circuits A 121 and B 122 and the restore circuit N 14 to another one, a selection circuit 22 for outputting a changeover selection signal to the selector switch 21, and current transformers 101, 102 and power transformers 111, 112, each of which detects condition of the power converter 20.

In this embodiment of such constitution, when the power converter 20 works normally (denoted as S21 in FIG. 4) but the control circuit A 121 in operation is broken for some reason (S22), it stops the controlling by the control circuit A 121. In this case, if a current value or a voltage value of a circuit of the power converter 20 is abnormal, detected by signals outputted from the current transformer 101, 102 and the power transformer 111, 112, it is determined that a failure of the power converter 20 has occurred (S23), the selection circuit 22 outputs a changeover selection signal to the selector switch 21, and the selector switch 21 changes a contact from the control circuit A 121 to the restore circuit N 14. This restore circuit N 14 sends a restoring operation signal to the power converter 20 for resetting the power converter 20 to return the stage of the power converter 20 into a normal state before the failure. Thereby, the current transformers 101 and 102 and the power transformers 111 and 112 of the circuit of the power converter 20 come to register values in normal ranges.

After that, the selector switch 21 changes a contact from the restore circuit N 14 to the control circuit B 122, which is a sound standby and the power converter 20 is operated and controlled by the signal outputted from the control circuit B 122 (S27), therefore, it can continue the operation and controlling of the power converter 20.

On the other hand, the control circuit A 121 in which a failure had occurred is initialized (S18). Thus, if the failure of the control circuit A 121 is only temporary, the control circuit A 121 can be reset to an ordinary state, and if the control circuit fails again, the normal operation and control of the power converter 20 can be performed continuously by the same action as the above-mentioned. The recorder 51 records states of the control circuits A 121 and B 122 and the selection circuit 22 in series, thus the cause of the unusual state can be found easily by investigation.

According to this embodiment, even if a single failure has occurred in the multiplex control units, operation and control of the power converter can be performed continuously by switching the control circuits, therefore, the power conversion device equipped with highly reliable multiplex control units can be obtained, and an uptime ratio of the system can be made high. Moreover, since the electric power converter 20 is returned to a normal state by the restore circuit N 14 as a special control circuit when abnormalities are found in the power converter 20, positive restoration can be attained.

Third Embodiment

Figure 5:
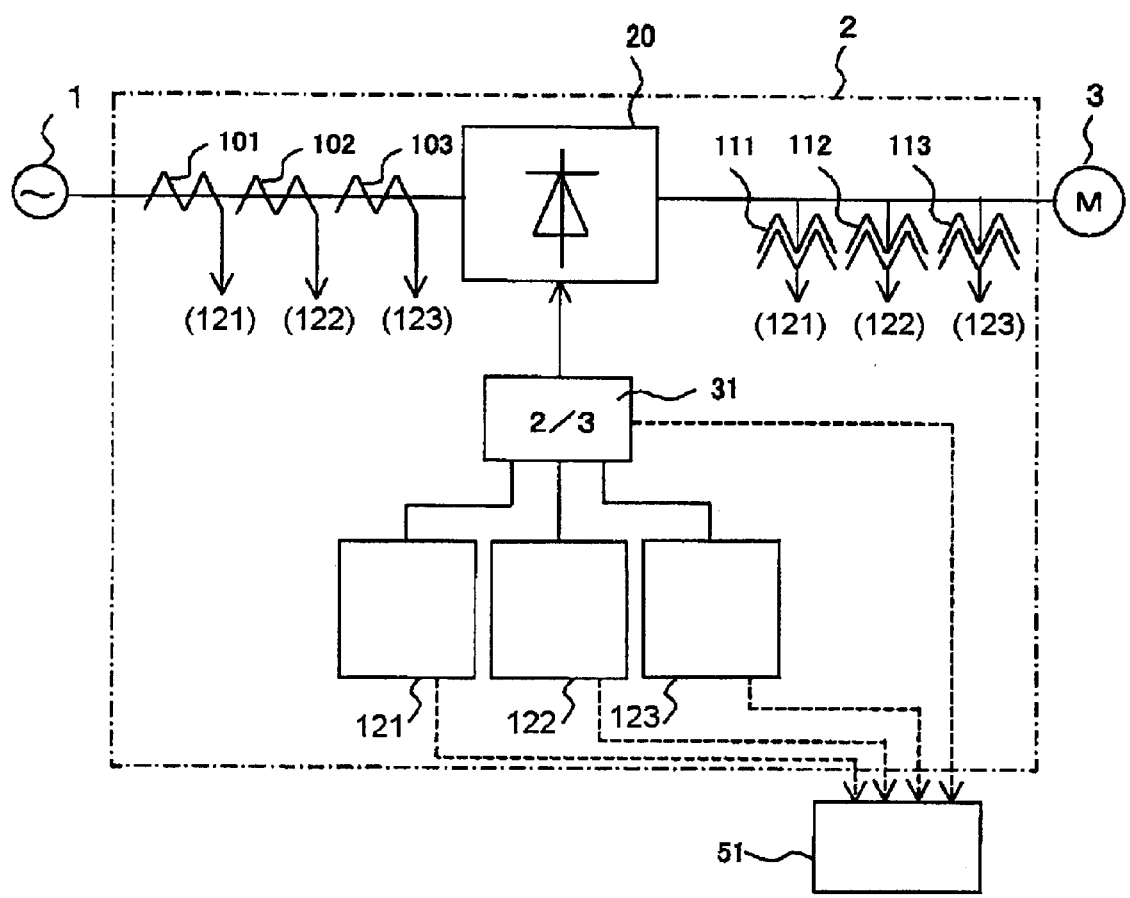
FIG. 5 is a basic block diagram showing a power conversion device of a third embodiment of this invention.
Figure 6:
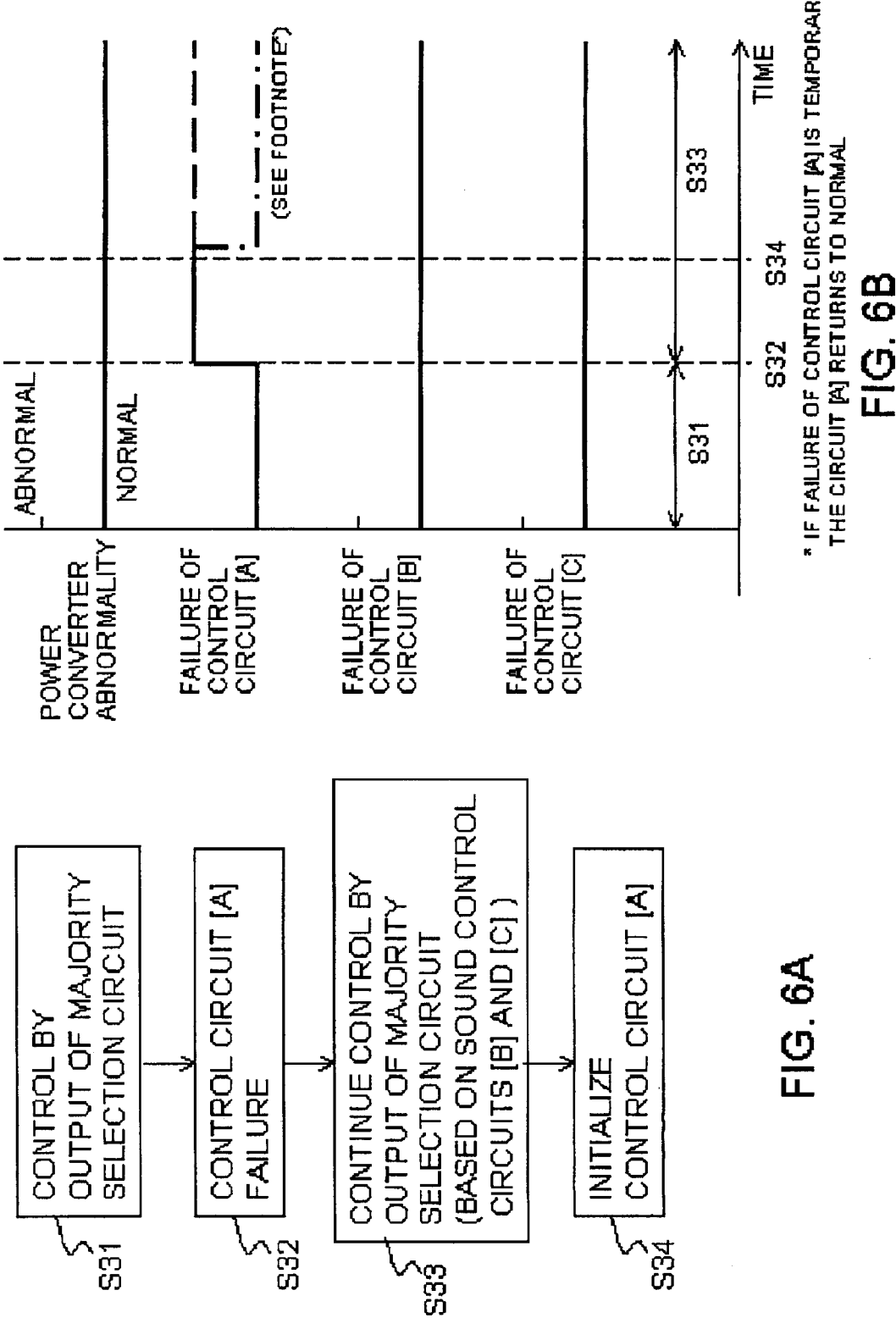
FIG. 6A is a flow chart showing a motion example of the power conversion device of the third embodiment as shown in FIG. 5.
FIG. 6B is a time chart corresponding to FIG. 6A.
Figure 7:
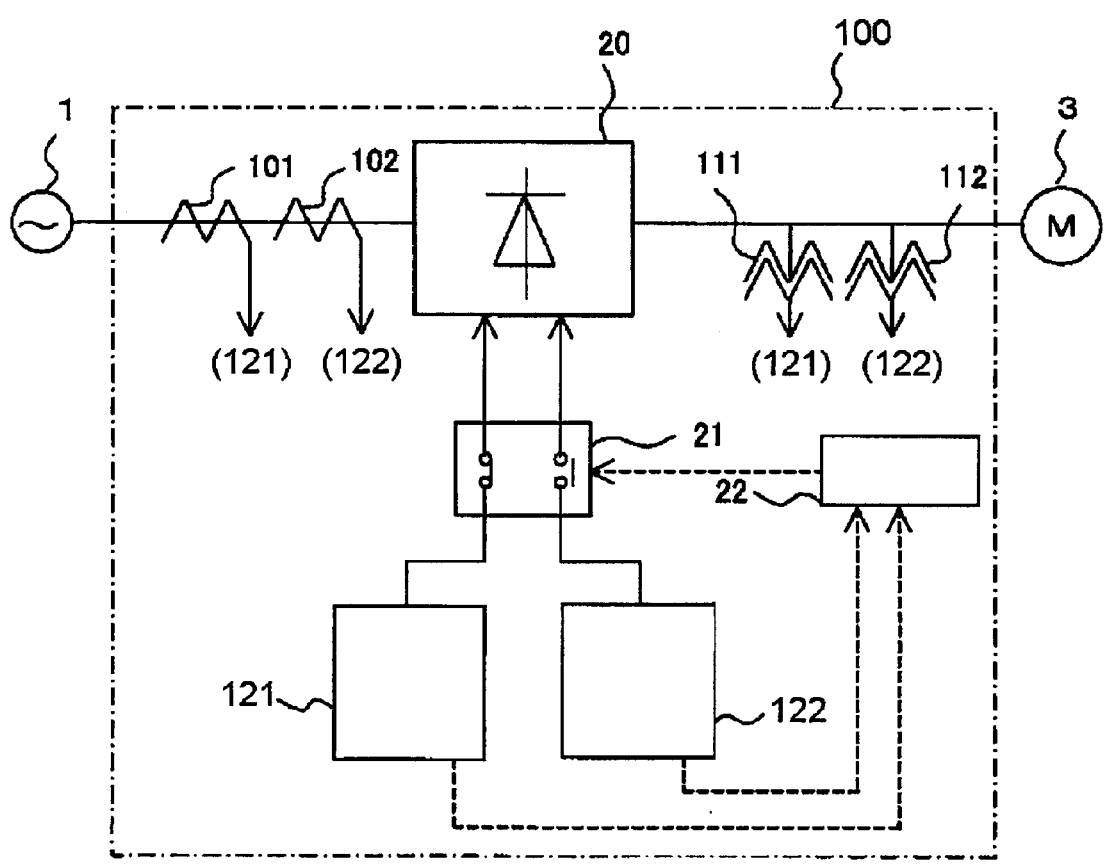
FIG. 7 is a circuit block diagram showing a conventional power conversion device.
Figure 8B:
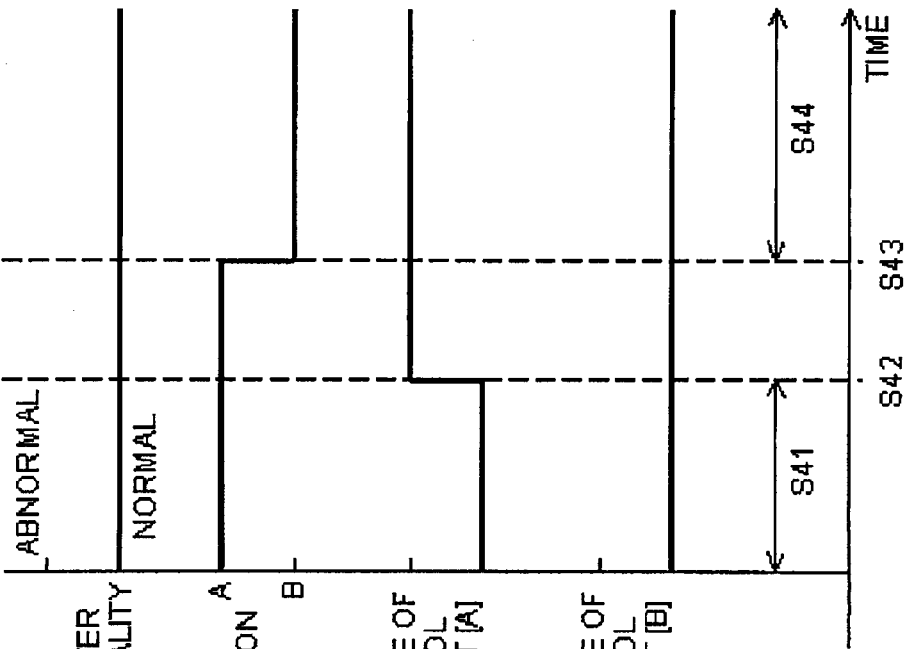
FIG. 8B is a time chart corresponding to FIG. 8A.
Figure 8A:
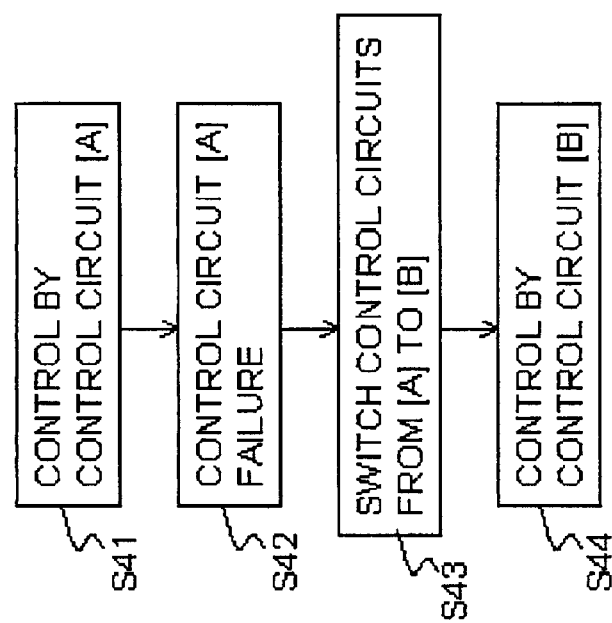
FIG. 8A is a flow chart showing an example in the conventional power conversion device as shown in FIG. 7 explaining its motions when one of switching circuits in the power conversion device fails.
Figure 9B:
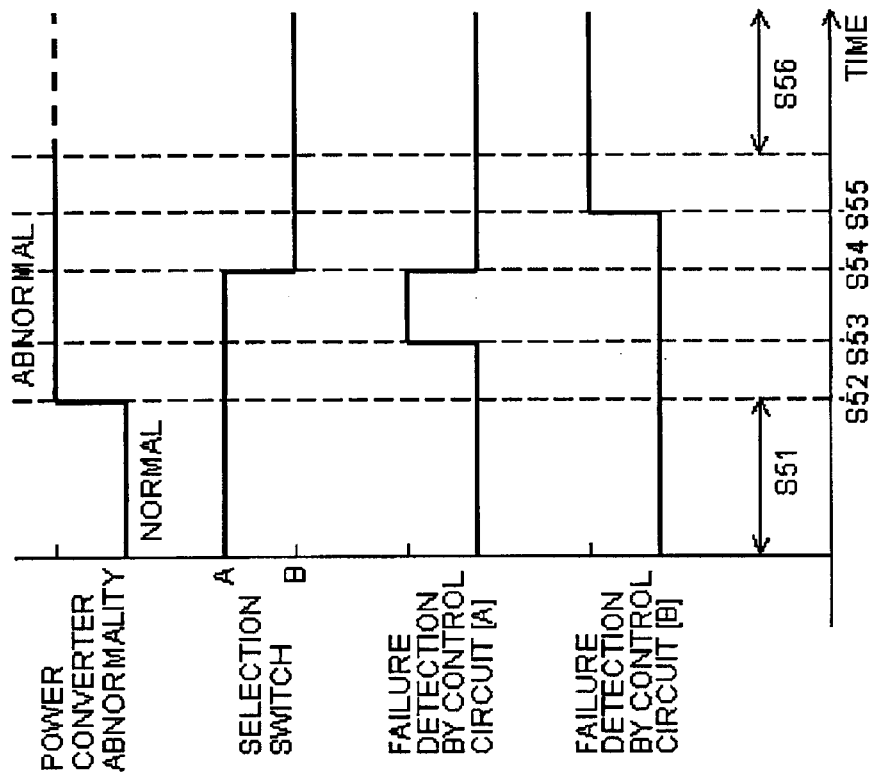
FIG. 9B is a time chart corresponding to FIG. 9A.
Figure 9A:
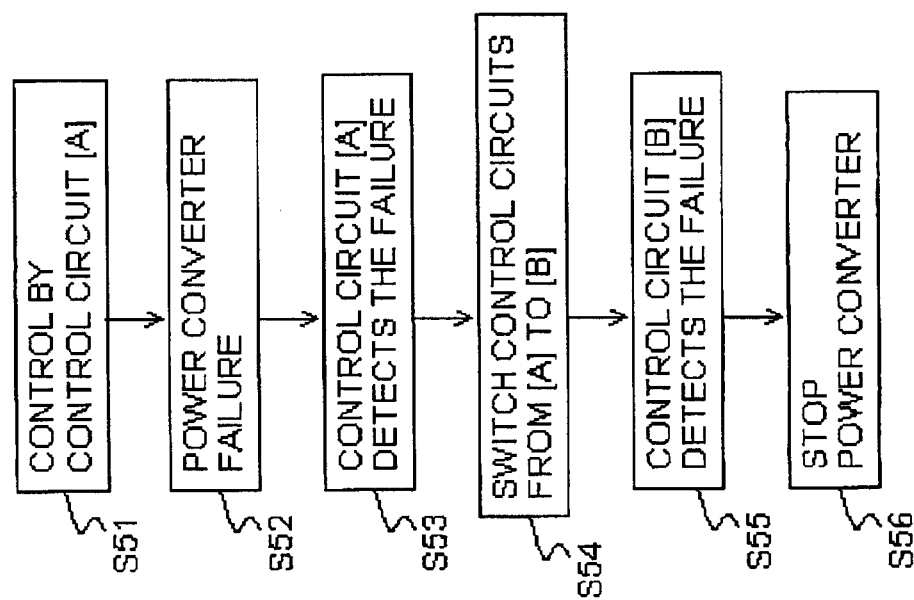
FIG. 9A is a flow chart showing an example in the conventional power conversion device as shown in FIG. 7 explaining its motions when a power converter in the power conversion device fails.
Figures 10A, 10B:
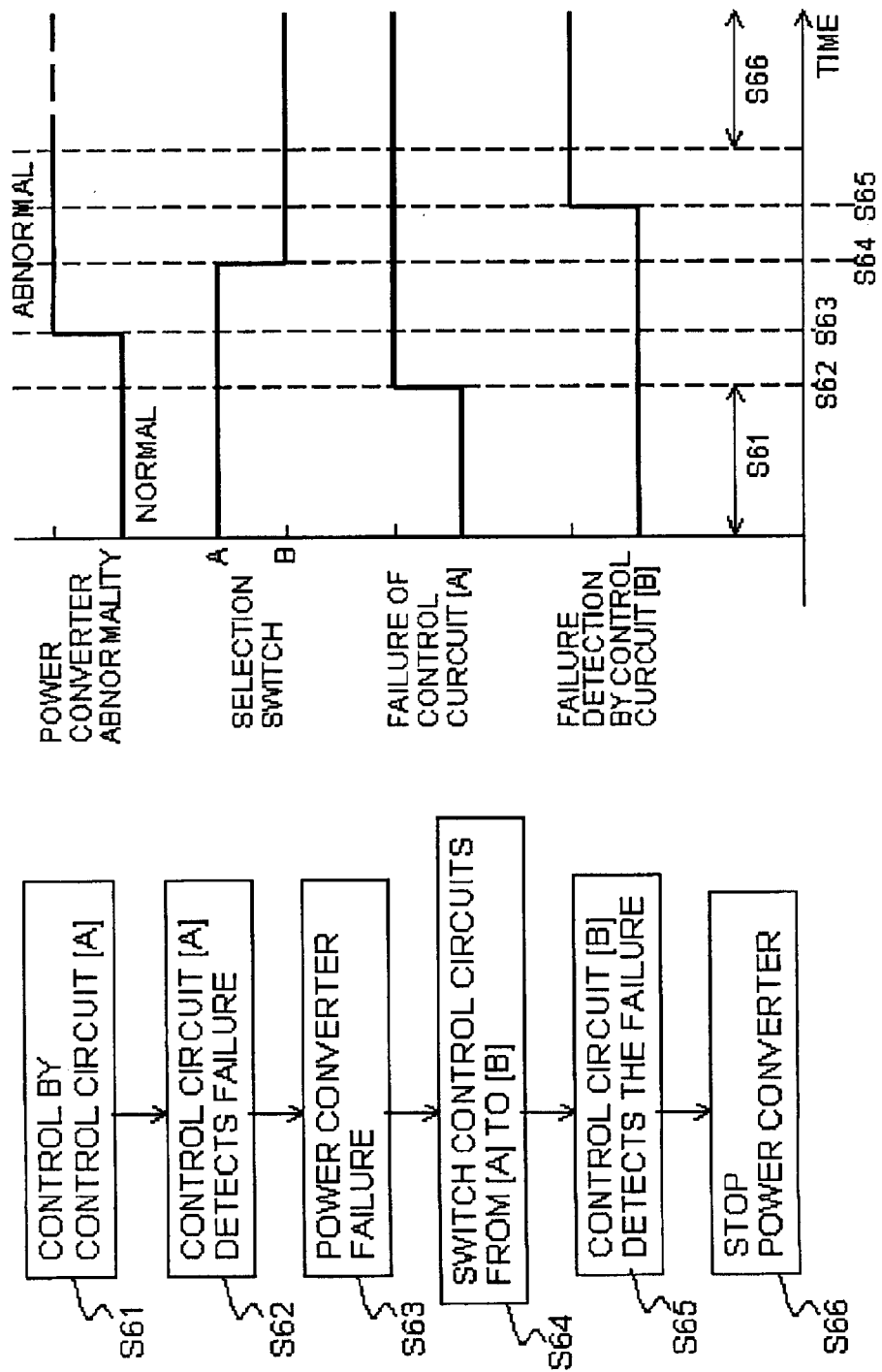
FIG. 10A is a flow chart showing an example in the conventional power conversion device as shown in FIG. 7 explaining its motions when one of control circuits in the power conversion device fails, accompanied with a failure of a power converter in the power conversion device.
FIG. 10B is a time chart corresponding to FIG. 10A.

Next, a power conversion device of a third embodiment of this invention is explained with reference to FIG. 5 and FIG. 6. In addition, the same portion as the first embodiment shown in FIG. 1 and FIG. 2 is attached to the same element numbers as in FIG. 1 and FIG. 2, and their explanations are omitted. In this embodiment, as shown in FIG. 5, multiplex control units of this power converter 20 for variable-speed control of the motor 3 are composed of more than two control circuits, and corresponding number of current transformers and power transformers. For example, as shown in FIG. 5, there are three control circuits including a control circuit A 121, a control circuit B 122 and a control circuit C 123, each of which is arranged to control the power converter 20, and current transformers 101, 102, 103 and power transformers 111, 112, 113 which detect a state of the power converter 20 and output signals to corresponding one of control circuits A 121, B 122, C 123, respectively. A majority selection circuit 31 receives signals outputted from the control circuits A 121, B 122 and C123 and performs majority decision of these three signals to select an output signal among them.

Thus, in this embodiment of such composition, when all three control circuits are operating soundly, three control signals outputted from the three control circuits are the same normal signal, then the majority selection circuit 31 selects and outputs one of the inputted signals such as a signal outputted from the control circuit A 121 (S11). In this case, if one cause breaks one of the sound control circuit, for example, the control circuit A 121 (S32), the control of the power converter 20 based on the signal outputted from the control circuit A 121 should be ceased and it should be changed into the control based on the sound signal such as a signal outputted either the control circuit B 122 or the control circuit C 123.

Here, the majority selection circuit 31 selects either one of the two signals outputted from the control circuit B 122 and the control circuit C 123 among the three signals and outputs the sound signal (S33), therefore, the power converter can be continued in normal operation without causing an abnormal state.

On the other hand, afterward, the control circuit A 121 in which the failure occurs is initialized, and if the failure of the control circuit A 121 is temporary, it returns to the normal state. Thus, even if another failure occurs in one of the control circuit B 122 and the control circuit C 123, the normal operation and control of the power converter can be performed continuously. Moreover, by recording states of the control circuits A 121, B 122 and C123 in series by the recording unit 51, investigation of a factor causing an unusual state in the switching of the control circuits can be made more easily.

According to this embodiment, even if a single failure occurs in the multiplex control units, it becomes possible to continue reliable operation and controlling of the power converter 20 by taking majority among the signals outputted from the control circuits, thus it can obtain a power conversion device equipped with the highly-reliable multiplex control units and higher rate of operation of the system.

In each embodiment explained above, the control circuits are settled dual or triple as multiplex units, it is also possible that multiplex number is set more than three. In this case, when one control circuit fails and the control circuit for operation is switched but the switched control circuit also becomes in a failure, the similar switching operation among the control units can be performed in sequence, thus the same effect as mentioned above in each embodiment can be obtained.

As mentioned above, according to this invention, in the power conversion device equipped with the power converter for controlling the motor in variable speed operation and multiplex control units for controlling the power converter, the operation and control of the power converter can be performed continuously without being affected by a single failure of the control circuit, therefore, the operation reliability can be raised.

The foregoing discussion discloses and describes merely a number of exemplary embodiments of the present invention. As will be understood by those skilled in the art, the present invention may be embodied in other specific forms without departing from the spirit or essential characteristics thereof. Accordingly, the disclosure of the present invention is intended to be illustrative of, but not limiting to, the scope of the invention, which is set forth in the following claims. Thus, the present invention may be embodied in various ways within the scope of the spirit of the invention.

What is claimed is:

1. A power conversion device comprising:
   a power converter which controls a motor in variable speed control;
   a first control circuit which outputs a first control signal to control the power converter;
   a second control circuit which outputs a second control signal to control the power converter;
   a first detector which detects a state of the power converter and outputs a first detection signal to the first control circuit;
   a second detector which detects a state of the power converter and outputs a second detection signal to the second control circuit;
   a switch which receives the first control signal and the second control signal and outputs one of the first control signal and the second control signal to the power converter; and
   a selection circuit which outputs a changeover selection signal to the switch for outputting the second control signal instead of the first control signal, when the switch has outputted the first control signal and the first control circuit fails,
   wherein at least one of the first control circuit and the second control circuit outputs a restoring signal to the power converter to return to a previous state of the power converter when the power converter fails.

2. The power conversion device as recited in claim 1, wherein after the selection circuit outputs the changeover selection signal, the failed one of the first control circuit and the second control circuit is initialized.

3. The power conversion device as recited in claim 1, further comprising a recorder which records the first detection signal and the second detection signal.

4. A power conversion device comprising:
   a power converter which controls a motor in variable speed control;
   a first control circuit which outputs a first control signal to control the power converter;
   a second control circuit which outputs a second control signal to control the power converter;
   a restore circuit which outputs a restoring signal to restore the power converter to return a previous state of the power converter;

a first detector which detects a state of the power converter and outputs a first detection signal to the first control circuit;

a second detector which detects a state of the power converter and outputs a second detection signal to the second control circuit;

a switch which receives the first control signal, the second control signal and the restoring signal and outputs one of the first control signal, the second control signal and the restoring signal to the power converter; and a selection circuit which outputs a changeover selection signal to the switch, firstly for outputting the restoring signal instead of the first control signal when the switch has outputted the first control signal and the first control circuit fails, and for outputting the second control signal instead of the restoring signal after the power converter has been returned to a previous normal state, wherein after the selection circuit outputs the changeover selection signal, the failed one of the first control circuit and the second control circuit is initialized.

5. The power conversion device as recited in claim 4, further comprising a recorder which records the first detection signal and the second detection signal.

6. A power conversion device comprising:

a power converter which controls a motor in variable speed control;

a first control circuit which outputs a first control signal to control the power converter;

a second control circuit which outputs a second control signal to control the power converter;

a third control circuit which outputs a third control signal to control the power converter;

first, second and third detectors each of which detects a state of the power converter and outputs, respectively, first, second and third detection signals to, respectively, the first, second and third control circuits; and a majority selection circuit which receives the first, second and third control signals, determines which of these three control signals forms a majority and outputs one of such majority signals to the power converter.

7. The power conversion device as recited in claim 6, further comprising a recorder which records the first, second and third detection signals.

8. A power conversion device comprising:

a power converter which controls a motor in variable speed control;

a plurality of at least three control circuits, each of which outputs a control signal to control the power converter;

a plurality of detectors for detecting a state of the power converter and for outputting a detection signal to each of the plurality of control circuits; and a majority selection circuit for receiving the control signals from the plurality of control circuits, determining which of the control signals forms a majority and outputting one of such majority signals to the power converter.

9. A control method of a power converter, which controls a motor in variable speed control, comprising:

first detecting of at least one of a current and a voltage of a first circuit at a side of the power converter;

second detecting of at least one of a current and a voltage of a second circuit at a side of the power converter;

first generating of a first control signal to the power converter in a first controller corresponding to the first circuit;

second generating of a second control signal to the power converter in a second controller corresponding to the second circuit;

sending the first control signal to the power converter as a direct control signal;

after the sending of the first control signal, switching the direct control signal to be sent to the power converter from the first control signal into the second control signal when failure of the first circuit is detected; and initializing the power converter when the power converter fails.

10. The power conversion device as recited in claim 1, wherein the power converter further comprises a condenser for storing electrical charges due to a failure of the first control circuit, and wherein the restoring signal causes the condenser to discharge.

11. The power conversion device as recited in claim 1, wherein the second control circuit assumes control of the power converter only after the discharge of the condenser has been completed.

12. The control method of a power converter as recited in claim 9, wherein a condenser in the power converter stores electrical charges due to a failure of the first circuit, and wherein the initializing step causes the condenser to discharge and the second circuit to assume control of the power converter only after the discharge of the condenser has been completed.

* * * * *